(12) United States Patent
Broomfield et al.

(10) Patent No.: US 11,359,672 B2
(45) Date of Patent: Jun. 14, 2022

(54) BEARING ASSEMBLY FOR ROTARY ELECTRIC MACHINE

(71) Applicant: KOCH ENGINEERED SOLUTIONS, LLC, Wichita, KS (US)

(72) Inventors: Dylan Broomfield, Gansevoort, NY (US); Russel Hugh Marvin, Potsdam, NY (US)

(73) Assignee: KOCH ENGINEERED SOLUTIONS, LLC, Wichita, KS (US)

(*) Notice: Subject to any disclaimer, the term of this patent is extended or adjusted under 35 U.S.C. 154(b) by 0 days.

(21) Appl. No.: 16/709,154

(22) Filed: Dec. 10, 2019

(65) Prior Publication Data

US 2021/0172479 A1 Jun. 10, 2021

(51) Int. Cl.
| | |
|---|---|
| F16C 35/06 | (2006.01) |
| F16C 19/06 | (2006.01) |
| H02K 5/173 | (2006.01) |
| H02K 5/20 | (2006.01) |
| F16C 35/077 | (2006.01) |
| H02K 5/16 | (2006.01) |
| H02K 5/08 | (2006.01) |
| H02K 9/19 | (2006.01) |
| H02K 5/04 | (2006.01) |
| H02K 15/14 | (2006.01) |
| H02K 5/02 | (2006.01) |

(52) U.S. Cl.
CPC ............ *F16C 35/06* (2013.01); *F16C 19/06* (2013.01); *F16C 35/077* (2013.01); *H02K 5/02* (2013.01); *H02K 5/04* (2013.01); *H02K 5/08* (2013.01); *H02K 5/16* (2013.01); *H02K 5/173* (2013.01); *H02K 5/20* (2013.01); *H02K 9/19* (2013.01); *H02K 15/14* (2013.01); *F16C 2226/16* (2013.01); *F16C 2380/26* (2013.01)

(58) Field of Classification Search
CPC ........ F16C 35/06; F16C 19/06; F16C 35/077; F16C 2226/16; F16C 2380/26; H02K 5/02; H02K 5/04; H02K 5/08; H02K 5/16; H02K 5/173; H02K 5/20; H02K 9/19; H02K 5/14
USPC .................................................. 310/90, 123
See application file for complete search history.

(56) References Cited

U.S. PATENT DOCUMENTS

| | | | | |
|---|---|---|---|---|
| 1,152,680 | A * | 9/1915 | Wieselgreen | F16C 27/04 384/535 |
| 2,300,957 | A * | 11/1942 | Miner, Jr. | H02K 5/04 310/40 R |
| 7,367,429 | B2 * | 5/2008 | Blecker | F16C 33/664 184/7.1 |
| 7,517,155 | B2 * | 4/2009 | Stout | F16C 23/08 384/535 |
| 7,553,123 | B2 * | 6/2009 | Casaro | F04D 19/04 384/536 |

(Continued)

*Primary Examiner* — Terrance L Kenerly
(74) *Attorney, Agent, or Firm* — Lathrop GPM LLP

(57) ABSTRACT

A wedge for securing a bearing and a bearing sleeve to an end bell of a rotating electric machine includes an annular base extending about a centerline and having an inner surface defining an opening through the base for receiving the bearing and the bearing sleeve. The base includes opposing first and second ends spaced circumferentially from one another by a gap for allowing relative movement therebetween during securing of the bearing and the bearing sleeve to the end bell.

15 Claims, 11 Drawing Sheets

(56) References Cited

U.S. PATENT DOCUMENTS

| | | | |
|---|---|---|---|
| 2003/0219183 A1* | 11/2003 | Schuetz | F16C 27/066 |
| | | | 384/536 |
| 2009/0139638 A1* | 6/2009 | Flores | F16C 32/0633 |
| | | | 156/210 |
| 2014/0117799 A1* | 5/2014 | Lu | H02K 11/0094 |
| | | | 310/71 |
| 2017/0012119 A1* | 1/2017 | Konstantinov | H01L 21/0465 |
| 2017/0353082 A1* | 12/2017 | Hamada | H02K 5/18 |

* cited by examiner

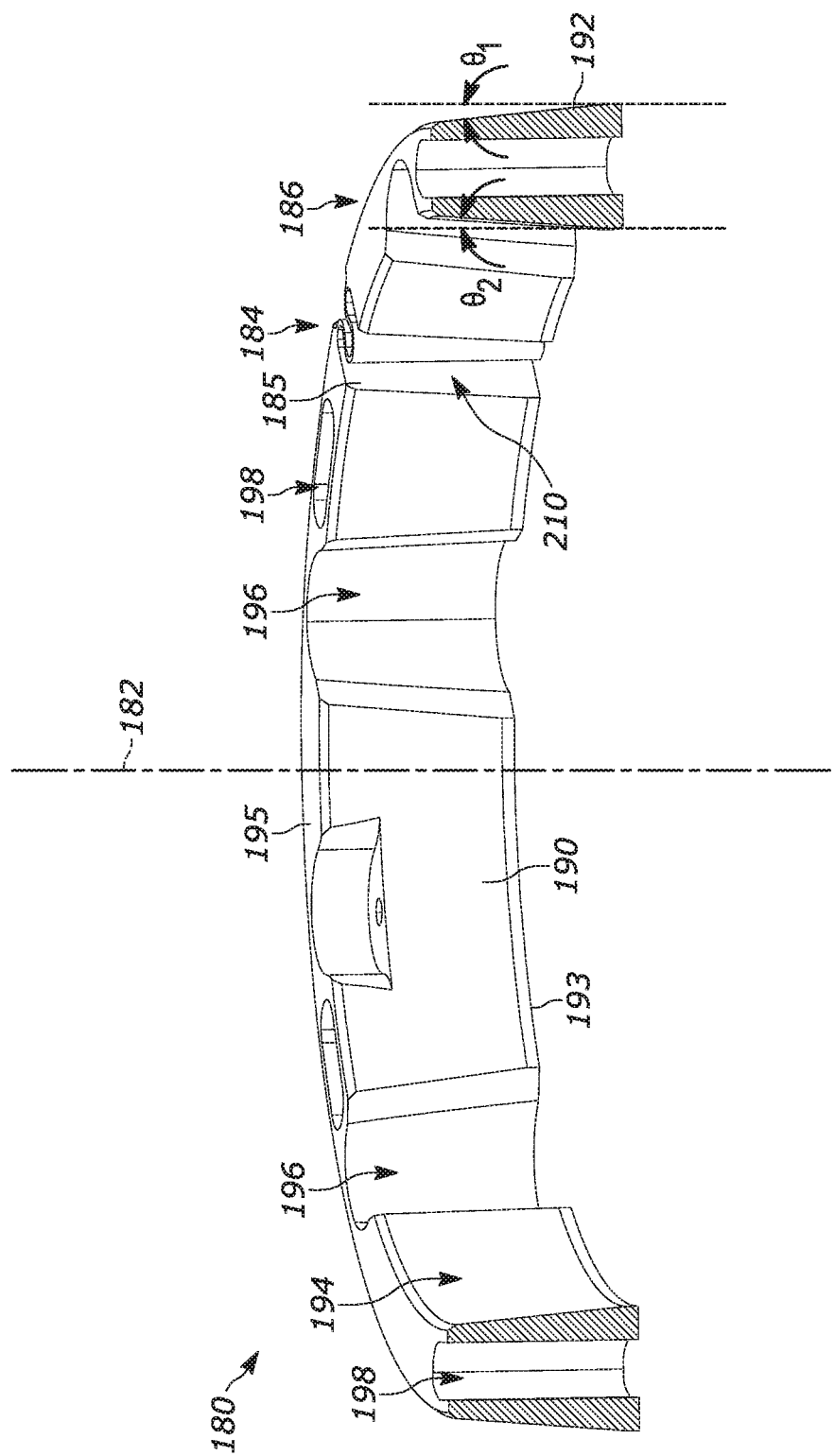

BEARING ASSEMBLY FOR ROTARY ELECTRIC MACHINE

TECHNICAL FIELD

The present invention relates generally to rotary electric machines, and specifically to a removable bearing assembly for rotary electric machines.

BACKGROUND

Degradation of bearings by electrical currents is an issue in the field of rotating electrical machinery. Currents can be induced by a potential between the rotor and stator of an electric machine. Bearings, especially ball bearings, have small points of contact between inner and outer rings and are easily damaged by electrical discharges. In response, many insulating bearings have a coating applied directly to the outer surfaces of the bearing. This method is difficult to use with stock bearings however.

Bearings must be changed as they wear to help prevent catastrophic failure. In large electric machines, it is impractical to remove the machine from where it is installed, so the bearings are changed in the field. Existing means of field changing often involve removing the end bell from the motor which is a laborious process.

Bearing heating is another known issue in rotating machines. As the bearing is run at faster speeds or higher mechanical loads, the increased friction causes increased heating. If the bearing is not cooled effectively, the resulting high temperatures can cause increased fatigue or premature failure.

SUMMARY

In one example, a wedge for securing a bearing and a bearing sleeve to an end bell of a rotating electric machine includes an annular base extending about a centerline and having an inner surface defining an opening through the base for receiving the bearing and the bearing sleeve. The base includes opposing first and second ends spaced circumferentially from one another by a gap for allowing relative movement therebetween during securing of the bearing and the bearing sleeve to the end bell.

In another example, a bearing sleeve for receiving a bearing for positioning in an end bell of a rotating electric machine includes an annular base having an inner surface defining an opening for receiving the bearing. At least a portion of the base is form fit with an electrically insulating material.

In another example, an assembly for a rotary electric machine having a bearing for receiving a portion of a rotor includes an end bell with an annular inner surface defining an opening for receiving the bearing. A bearing sleeve includes an annular base having an inner surface defining an opening for receiving the bearing and an outer surface. A wedge includes an annular base with an inner surface defining an opening through the base for receiving the bearing such that the outer surface of the bearing sleeve engages the inner surface of the wedge. The base includes opposing first and second ends spaced circumferentially from one another by a gap for allowing relative movement therebetween during securing of the bearing and the bearing sleeve to the end bell.

Other objects and advantages and a fuller understanding of the invention will be had from the following detailed description and the accompanying drawings.

BRIEF DESCRIPTION OF THE DRAWINGS

FIG. 5C is a section view of the wedge of FIG. 5A taken along line 5C-5C.

DETAILED DESCRIPTION

Figure 1A:
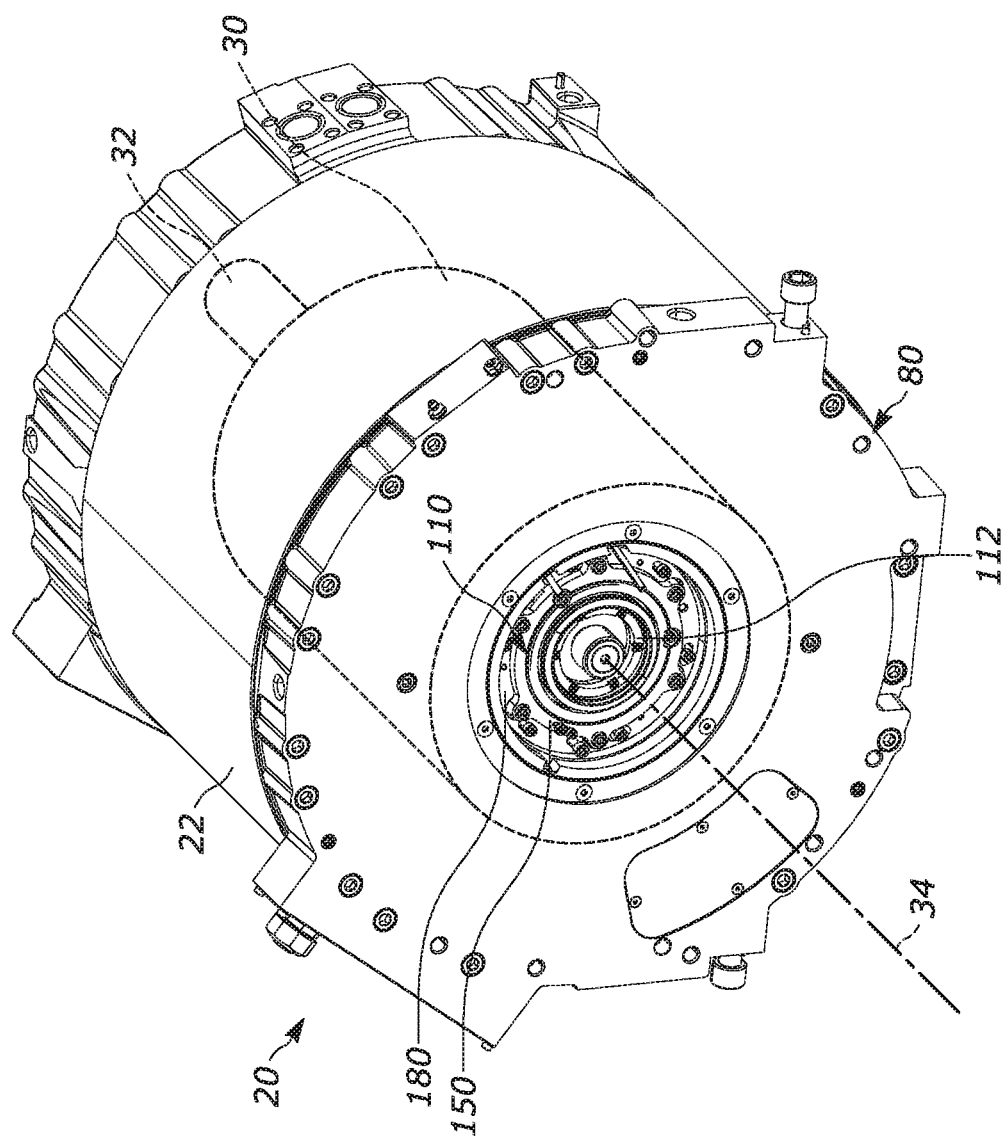
FIG. 1A is a front view of a rotary electric machine having an example bearing assembly.
Figure 1B:
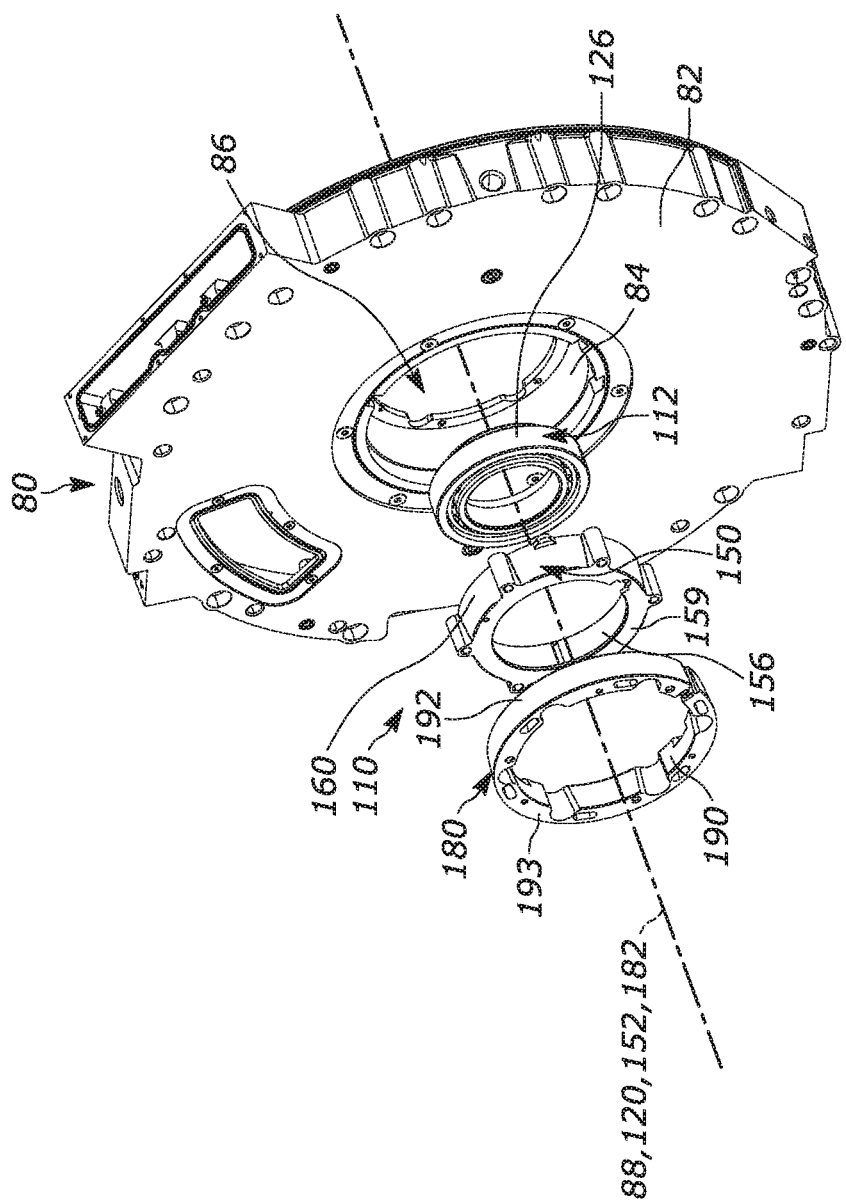
FIG. 1B is an exploded view of a portion of FIG. 1A.

The present invention relates generally to rotary electric machines, and specifically to a removable bearing assembly for rotary electric machines. Referring to FIGS. 1A-1B, one example rotary electric machine 20 includes a stator 22 and a rotor 30 (shown in phantom) having a shaft 32 rotatable about an axis 34 within and relative to the stator. An end bell 80 extends over an axial end of the stator 22 and is secured thereto with fasteners or the like. A bearing assembly 110 cooperates with the end bell 80 to secure and align the shaft 32.

Figure 2A:
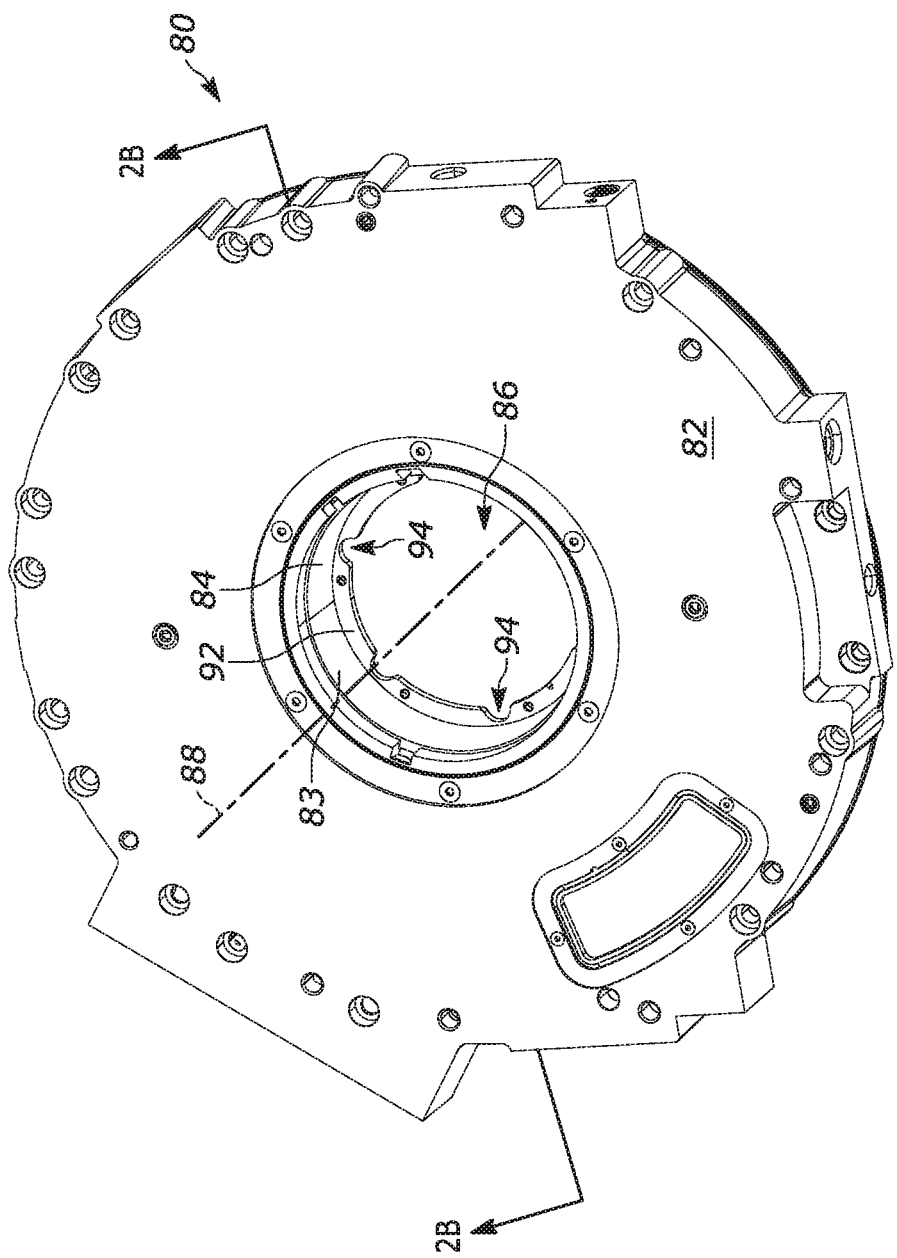
FIG. 2A is a top view of an end bell of the rotary electric machine.
Figure 2B:
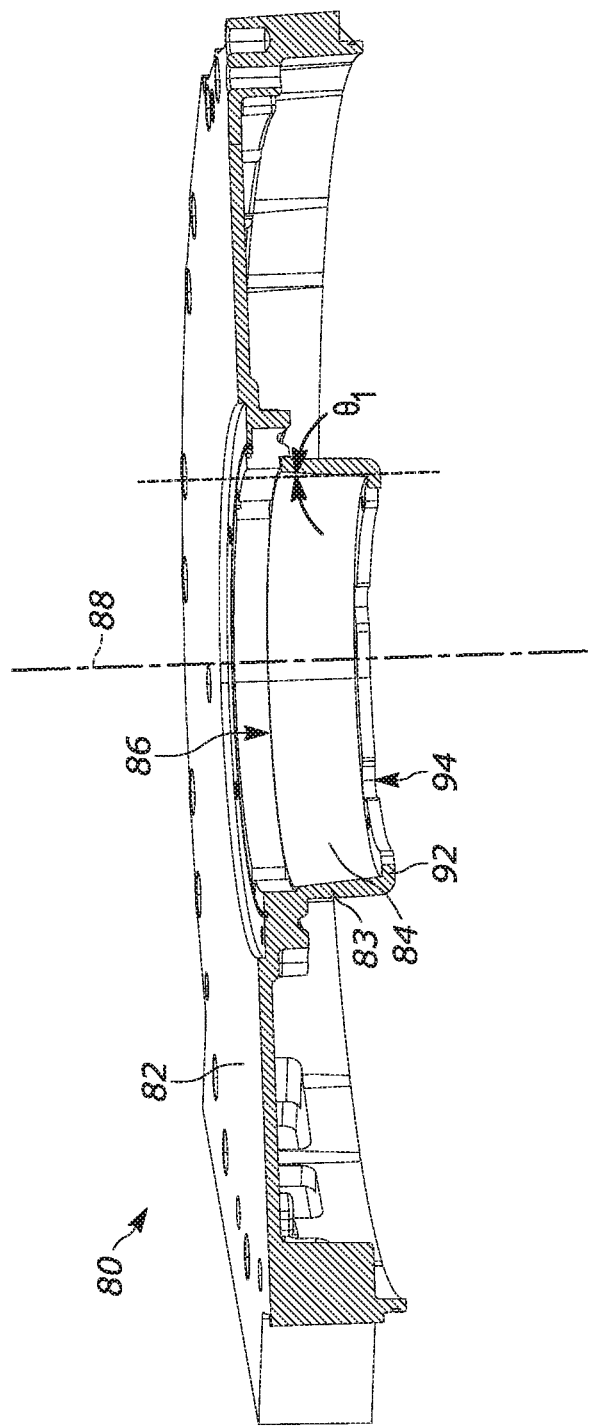
FIG. 2B is a section view of the end bell taken along line 2B-2B.

As shown in FIGS. 2A-2B, the end bell 80 includes an axial end surface 82 facing away from the stator 22. A hollow projection 83 extends away from the axial end surface 82 and includes an annular inner surface 84. In one example, the projection 83 is substantially L-shaped and includes a leg 92. The leg 92 extends from the inner surface 84 radially into the opening 86 and encircles the centerline 88. Recesses or pockets 94 extend radially outward into the leg 92. The pockets 94 can have a rounded shape.

The inner surface 84 defines an opening 86 centered on a centerline 88. The opening 86 receives the bearing assembly 110 and shaft 32 of the rotor 30. The inner surface 84 (FIG. 2B) extends at an angle $\theta_1$ relative to the centerline 88 and therefore is angled or tapered. The angle $\theta_1$ can be on the order of about 1-20°, for example 5°. As shown, the inner surface 84 tapers outward away from the centerline 88 in a direction extending towards the axial end surface 82. Accordingly, the diameter of the opening 86 is largest adjacent the axial end surface 82 and smallest at the leg 92.

Figure 3:
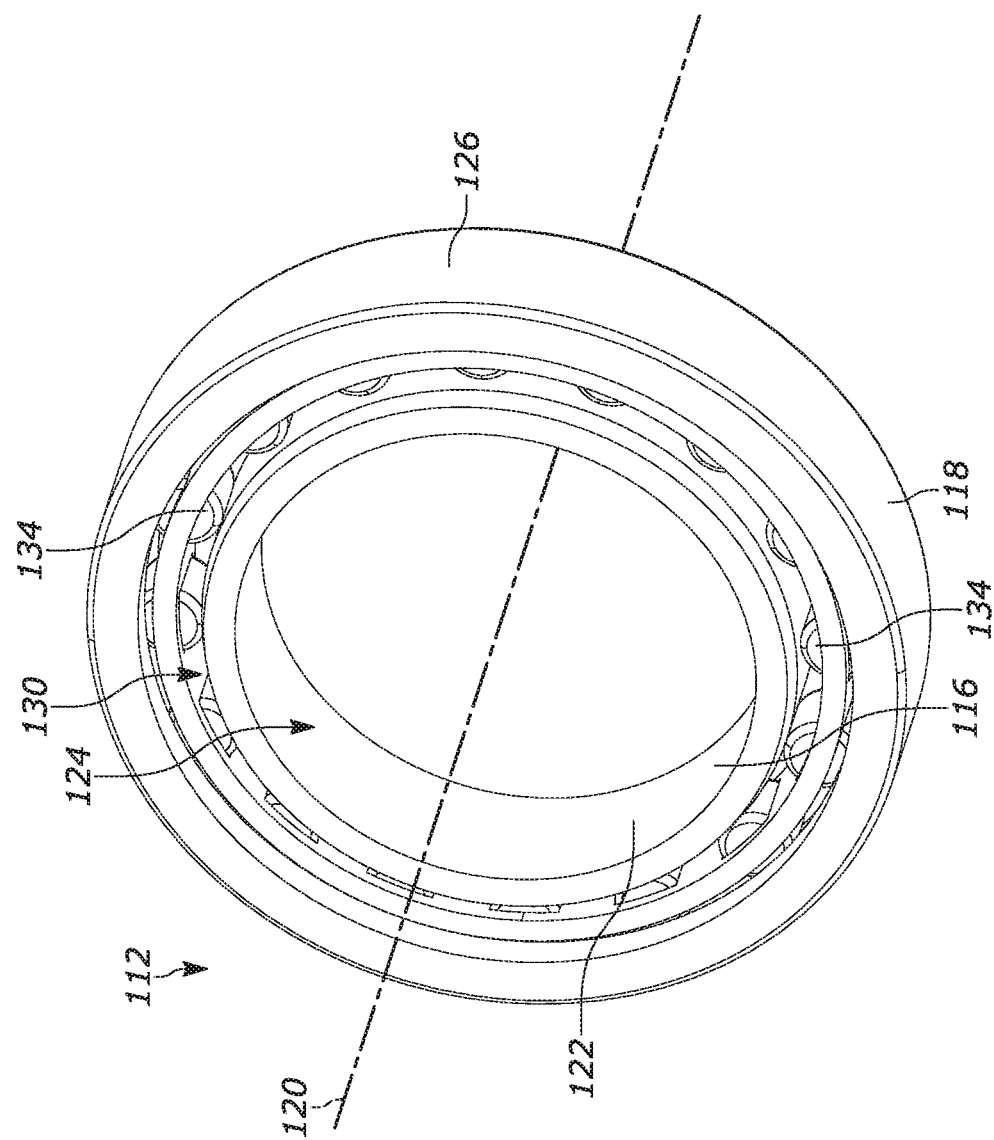
FIG. 3 is a top view of a bearing of the bearing assembly.

The bearing assembly 110 (FIG. 1B) includes a bearing 112, a bearing sleeve 150, and a wedge 180. Referring to FIG. 3, the bearing 112 includes inner and outer rings 116, 118 centered about an axis 120 and rotatably connected to one another. The inner ring 116 includes an inner surface 122 defining an opening 124 therethrough. The outer ring 118 includes an outer surface 126 concentric with the inner surface 122 of the inner ring 116.

The inner and outer rings 116, 118 cooperate to define a track 130 for receiving rotating members or bearings 134. The rotating members 134 can be spherical, cylindrical, frustoconical, etc. Rotation of the inner ring 116 relative to the outer ring 118 is facilitated by rotation of the rotating members 134 relative to one another in combination with orbital or circumferential movement of the rotating members about the axis 120.

Figure 4A:
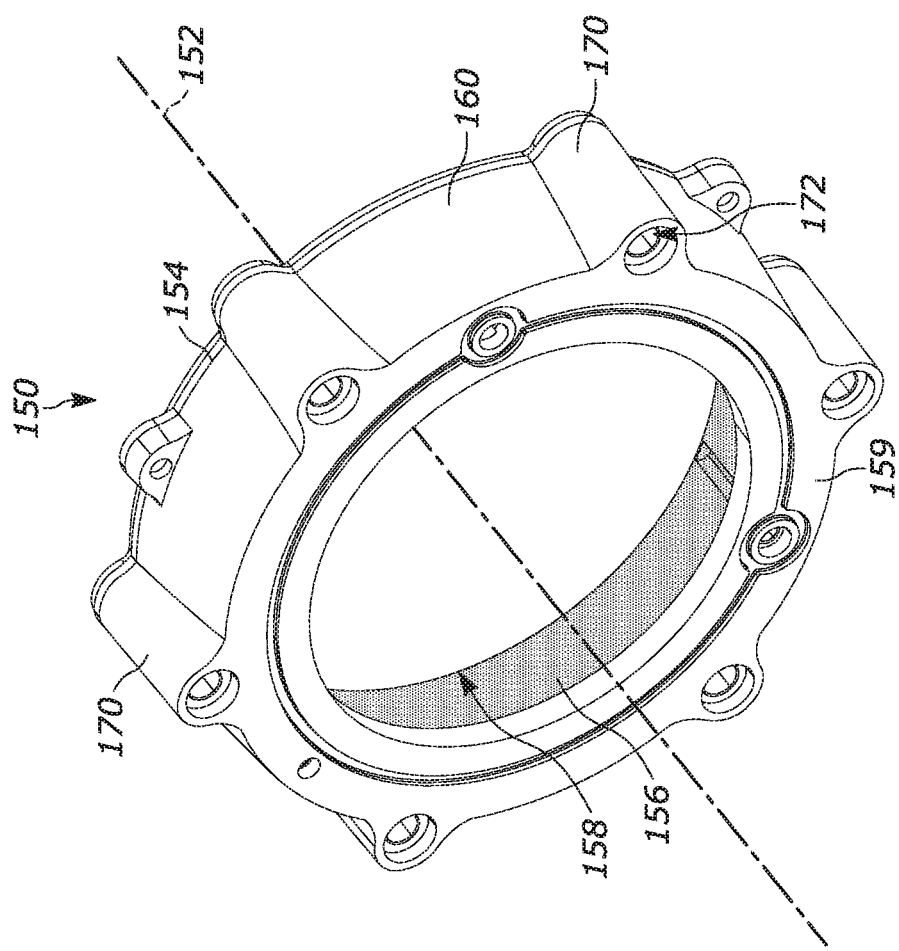
FIG. 4 is a top view of a bearing sleeve of the bearing assembly.
Figure 4B:
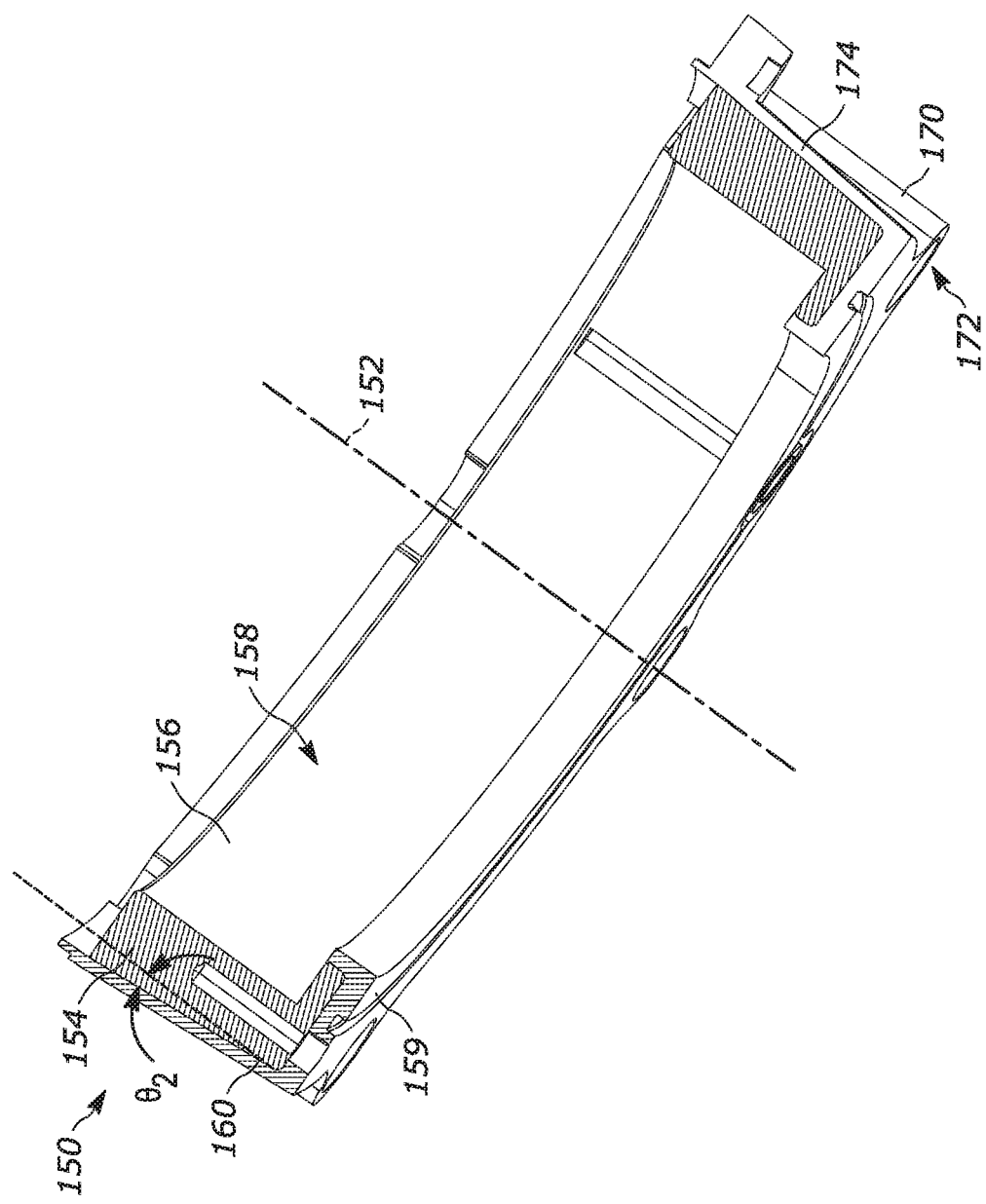

As shown in FIGS. 4A-4B, the bearing sleeve 150 is annular and extends about a centerline 152. The bearing sleeve 150 includes a base 154 having an inner surface 156 defining an opening 158 centered on the centerline 152 and an outer surface 160. The outer surface 160 extends at the angle $\theta_2$ relative to the centerline 152. The angle $\theta_2$ can be on the order of about 1-20°, for example 5°. As shown, the outer surface 160 tapers inward towards the centerline 152 in a direction extending towards an axial end surface 159. Accordingly, the diameter of the opening 86 is smallest adjacent the axial end surface 159.

Projections 170 extend from the outer surface 160. The projections 170 are symmetrically arranged about the centerline 152 and have a length extending axially along the base 154. The projections 170 have substantially the same axial cross-sectional shape as the pockets 94 in the end bell 80. A passage 172 extends through the entire length of each projection 170.

The bearing sleeve 150 is formed from a durable material, such as metal. The inner surface 156 is precision ground to meet the bearing 112 installation requirements. The remainder of the bearing sleeve 150 can be surrounded by or encased in an electrically insulating material 174 form fit to the bearing sleeve. In one example, the electrically insulating material 174 is applied directly to the bearing sleeve 150 in a liquid-like or similar state to enable bonding, e.g., adhesive bonding, with the metal bearing sleeve. The electrically insulating material 174 can then be cured (if needed) by heat, ultraviolet (UV) light, chemicals, etc. It will be appreciated that the insulating material 174 could be provided on the inner surface 156 and tailored to accept the bearing 112 (not shown). Regardless, the insulating material 174 is provided to reduce or eliminate possible current spikes between the rotor 30 and the stator/end bell 80 from impacting the bearing 112.

In an example method, the electrically insulating material 174 can be overmolded to the bearing sleeve 150. The bearing sleeve 150 can be held inside a mold and the insulating material 174 introduced therein, filling the space between the bearing sleeve 150 and the mold and affixing to the bearing sleeve. Alternatively, the electrically insulating material 174 can be thermally sprayed onto the bearing sleeve 150. In this instance, the electrically insulating material 174 is provided as small, ceramic and/or plastic particles that are heated to or above the melting or glass transition temperature and accelerated towards the bearing sleeve 150 sufficient to adhere thereto. That said, the electrically insulating material 174 can have an adhesive connection with the bearing sleeve 150.

The electrically insulating material 174 can have a thermal conductivity and thickness sufficient to allow heat to pass radially outward from the bearing 112 through the electrically insulating material during operation of the rotary electric machine 20. In one example, the thermal conductivity is greater than at least about 1 W/mK. Example electrically conductive materials 174 include plastics, ceramics and/or polymers, such as polyphenylene sulfide (PPS), and can include additives. Any materials with thermal conductivities greater than about 1 W/mK are contemplated.

Figure 5A:
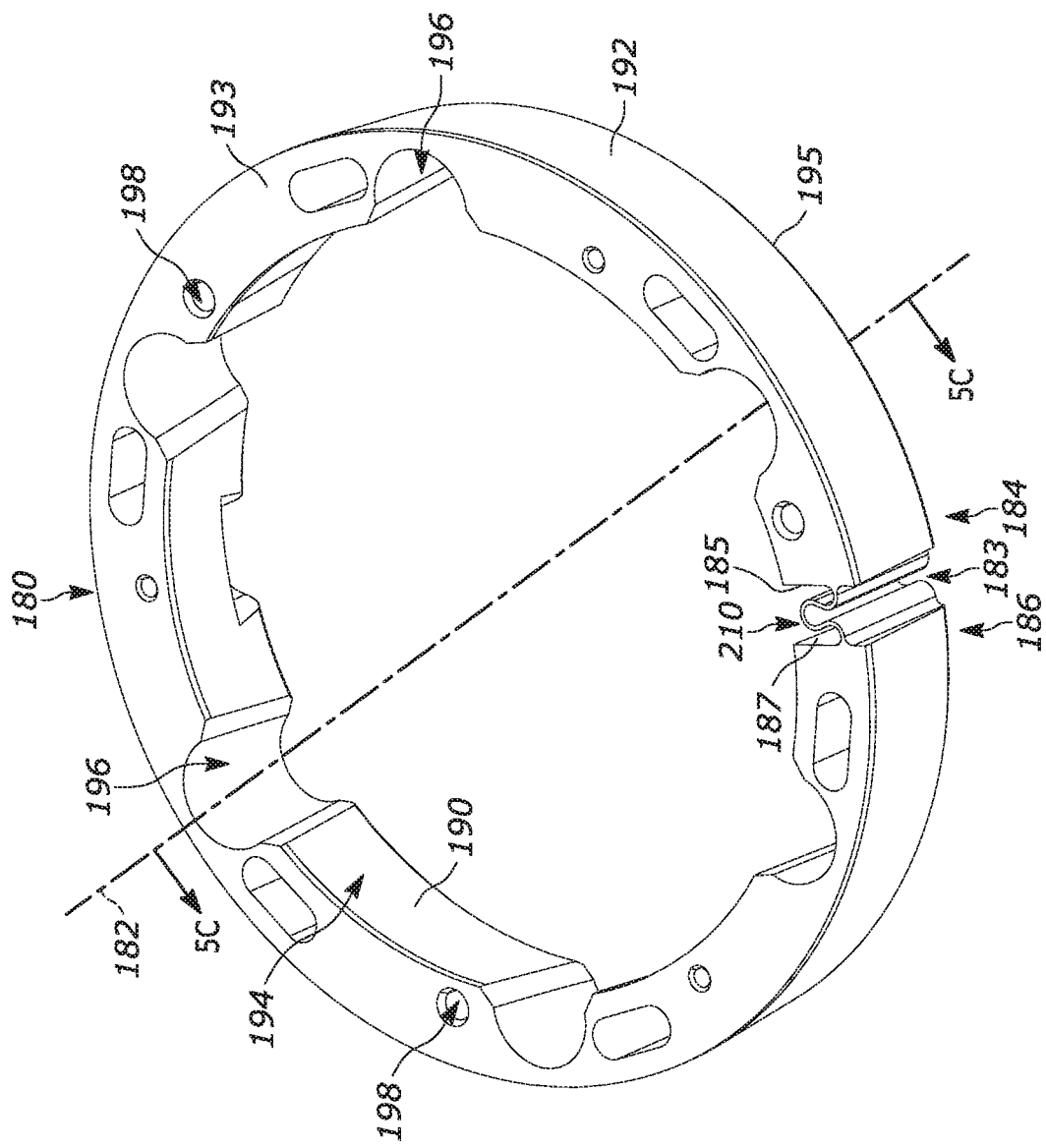
FIG. 5A is a top view of a wedge of the bearing assembly.
Figure 5B:
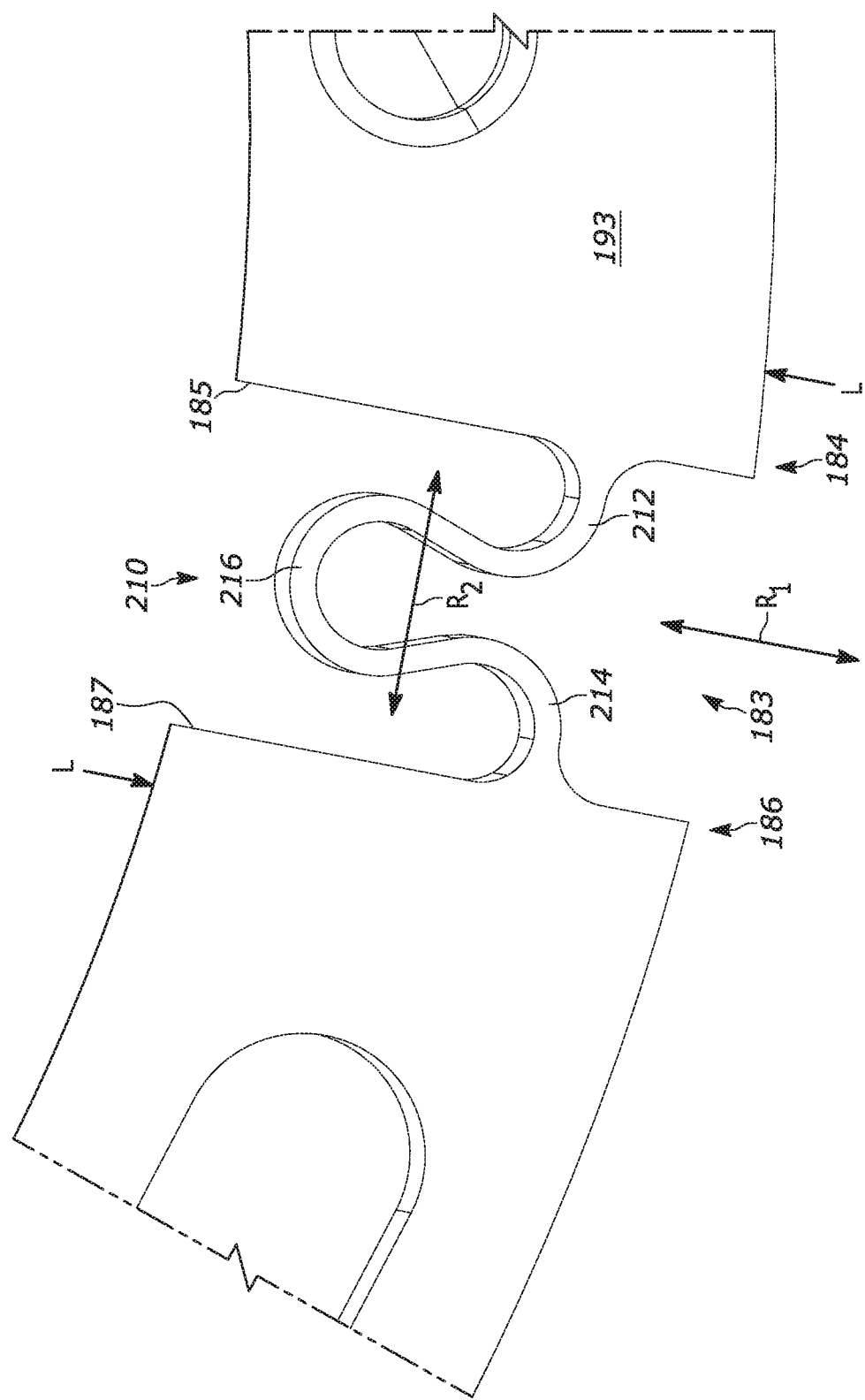
FIG. 5B is an enlarged view of a portion of FIG. 5A.

Referring to FIGS. 5A-5B, the wedge 180 is annular and extends circumferentially about a centerline 182 from a first end 184 to a second end 186 spaced therefrom by a gap 183. An inner surface 190 and an outer surface 192 extending generally concentric with one another about the centerline 182. The inner surface 190 defines an opening 194 centered on the centerline 182. Axial end surfaces 193, 195 are positioned on opposite sides of the surfaces 190, 192.

Passages 198 extend between the axial end surfaces 193, 195 and are arranged circumferentially about the centerline 182.

The first end 184 terminates at a circumferential end surface 185. The second end 186 terminates at a circumferential end surface 187 confronting or opposing the surface 185. A flexible member 210 (FIG. 5B) includes a pair of legs 212, 214 secured to or integrally formed with the respective first and second ends 184, 186. More specifically, the leg 212 extends from the surface 185 of the first end 184. The leg 214 extends from the surface 187 of the second end 186.

A connecting portion 216 interconnects the legs 212, 214. The connection portion 216 can be round or curved. In one example, the connecting portion 216 has a looped curved, rounded or omega-shape extending radially inwards towards the centerline 182. With this in mind, the gap 183 allows for relative movement, e.g., circumferential, radial, and/or axial movement, between the ends 184, 186 in at least the manners $R_1$, $R_2$ in response to loads L applied to the first and/or second ends 184, 186. The flexible member 210 is configured to limit relative movement between the ends 184, 186 to help maintain the ends in the same plane.

Referring to FIG. 5C, the inner surface 190 extends at the angle $\theta_2$ relative to the centerline 182 and therefore has the same angled configuration as the outer surface 160 of the bearing sleeve 150. The outer surface 192 extends at the angle $\theta_1$ relative to the centerline 152 and therefore has the same angled configuration as the inner surface 84 of the end bell 80. As shown, the inner surface 190 tapers inwards towards the centerline 182 in a direction extending towards the axial end surface 193. The outer surface 192 tapers inward towards the centerline 182 in direction extending towards the axial end surface 195. Consequently, the wedge 180 has a trapezoidal cross-section in the circumferential direction.

Recesses 196 are formed in the inner surface 190 and extend the entire axial length of the wedge 180. The recesses 196 are arranged in a circumferential pattern about the centerline 182 and are sized, shaped, and positioned to receive the projections 170 on the bearing sleeve 150.

Referring back to FIG. 1A-1B, to assemble the bearing assembly 110 the bearing 112 is connected to the shaft 32 so as to be rotatable therewith and generally centered within the opening 86 in the end bell 80. The bearing sleeve 150 is inserted into the opening 86 over the bearing 112 such that the projections 170 on the bearing sleeve 150 extend into the pockets 94 in the end bell 80 and the axial end surface 159 faces outward away from the end bell 80. When this occurs, the outer surface 126 of the bearing 112 moves into engagement with the inner surface 156 of the bearing sleeve 150.

Figure 6:
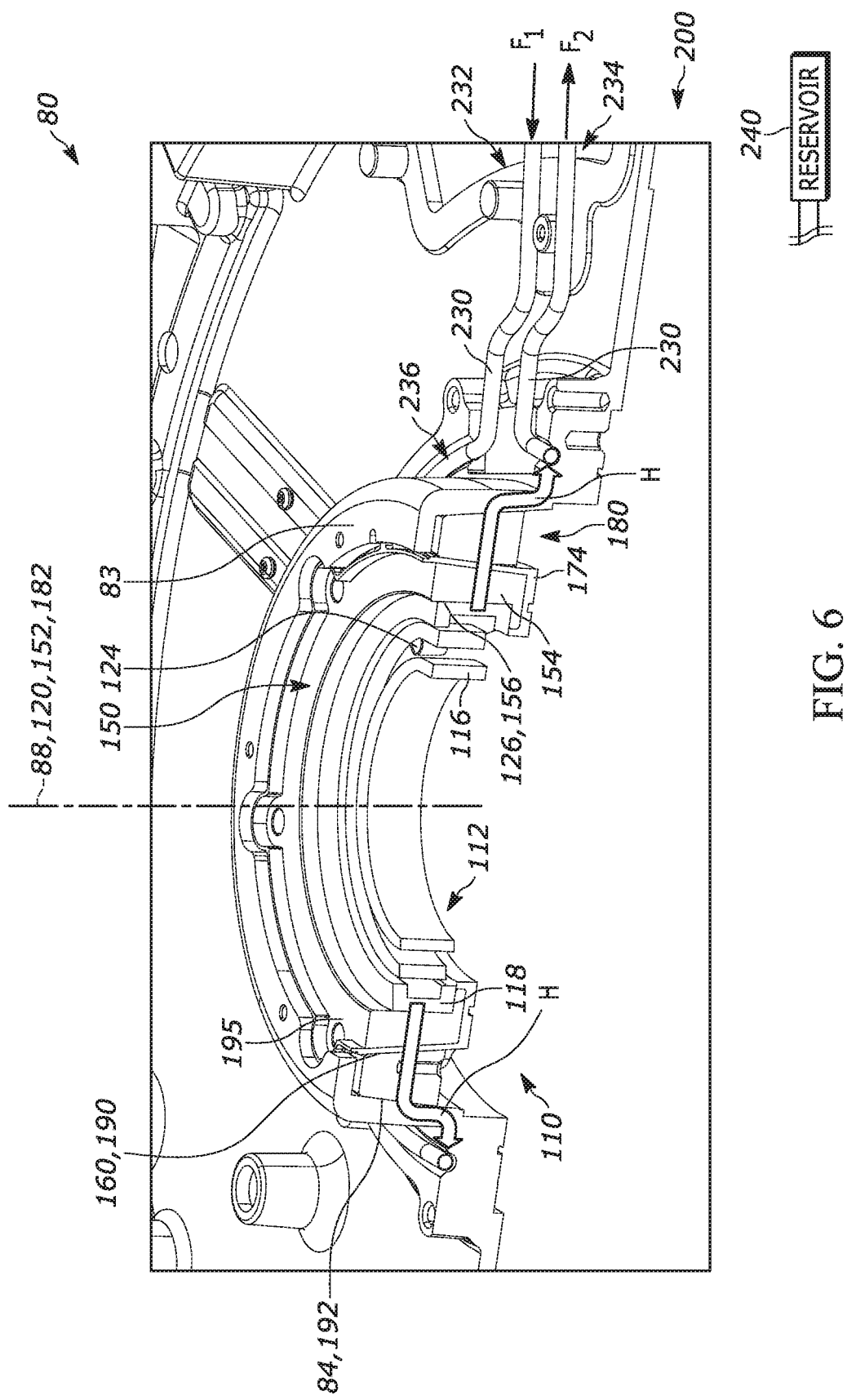
FIG. 6 is a schematic illustration of a cooling system connected to the end bell.

The wedge 180—with the axial end surface 193 facing outward away from the end bell 80—is then driven into the opening 86 between the bearing sleeve 150 and the end bell. More specifically, the recesses 196 in the wedge 180 are aligned with the projections 170 on the bearing sleeve 150 such that inserting the wedge 180 into the opening 86 positions the projections 170 within the recesses 196. This simultaneously moves the outer surface 192 of the wedge 180 into engagement with the inner surface 84 of the end bell 80. The electrically insulating material 174 on the exterior of the bearing sleeve 150 engages the inner surface 190 of the wedge 180 (see also FIG. 6). Threaded fasteners or the like (not shown) can extend through the passages 172 in the bearing sleeve 150 and the passages 198 in the wedge 180 to rigidly secure the bearing assembly 110 components to and within the end bell 80.

The tapered surfaces on the bearing assembly 110 and end bell 80 help to preserve alignment between the components.

To this end, the mating surfaces 160, 190 on the bearing sleeve 150 and wedge 180, respectively, extend at the same angle $\theta_2$. The mating surfaces 84, 192 on the end bell 80 and wedge 180, respectively, extend at the same angle $\theta_1$. Consequently, driving the wedge 180 in between the end bell 80 and the bearing sleeve 150 applies compressive forces to the outer surface 160 of the bearing sleeve 150 in the radially inward direction. At the same time, the inner surface 84 of the end bell 80 applies reaction surfaces to the outer surface 192 of the wedge 180 in the radially inward direction. Moreover, the precision ground inner surface 156 of the bearing sleeve 150 ensures a tight fit between the bearing sleeve 150 and the outer surface 126 of the bearing 112.

These forces cooperate to rigidly hold the bearing 112 in place and thereby precisely hold the shaft 32 of the rotor 30 in place. In particular, any attempt during operation of the rotary electric machine 20 of the shaft 32 to tilt or shift relative to the axis 34 is counteracted by the radially inward forces provided by the bearing assembly 110 to the shaft in every radial direction.

During installation, any misalignment of the components 112, 150, 180 of the bearing assembly 110 with each other and/or with the end bell 80 generally cause one mating surface to engage before the other. In order to enable realignment between the components 80, 112, 150, 180, the gap 183 advantageously allows the ends 184, 186 thereof to move relative to one another (see FIG. 5B) in response to the loads L generated by the asymmetrical engagement.

In particular, the gap 183 allows for relative radial movement $R_1$, relative circumferential movement $R_2$ and/or relative axial movement (not shown) between the ends 184, 186 to allow the bearing 112, bearing sleeve 150, and wedge 180 to properly align with one another and align with the centerline 88 of the opening 86 in the end bell 80. The flexible member 210 is durable and resilient enough to maintain axial stiffness in the wedge 180 during any relative movement. To this end, the flexible member 210 restrains movement between the ends 184, 186 to help keep the ends 184, 186 of the wedge 180 in a single plane.

During operation, the bearing assembly 110 helps maintain properly alignment between the shaft 32 and end bell 80 as the shaft rotates within the bearing 112. With this in mind, the electrically insulating material 174 on the bearing sleeve 150 advantageously helps to prevent the flow of electricity through the bearing 112 during operation of the rotary electric machine 20.

Over time, the bearing 112 can become worn or have reduced efficacy. With this and the aforementioned issues of replacing current bearings in the field in mind, the bearing assembly 110 shown and described herein advantageously allows for easy assembly of the rotor 30 from the stator during production, as well as during field changing of a bearing by the customer without requiring the end bell 80 to be removed. To this end, the shaft 32 of the rotor 30 is first immobilized in the radial direction relative to the end bell to preserve alignment. This is particularly desirable in permanent magnet machines where the rotor shaft can move radially, i.e., tilt or shift relative to its rotational axis, into engagement with the stator if alignment is lost.

Once the shaft 32 is immobilized the wedge 180 can be readily removed from between the bearing sleeve 150 and inner surface 84 of the end bell 80. This can be facilitated by manipulating the ends 184, 186 of the wedge 180. More specifically, the flexible member 210 allows the ends 184, 186 to be moved toward or away from one another and/or radially inward or outward to adjust the shape of the wedge 180 in a manner that reduces or eliminates binding forces between the wedge and the end bell 80 and/or bearing sleeve 150. Alternatively or additionally, driving the wedge 180 out of the opening 86 and away from the end bell 80 can automatically cause the ends 184, 186 to move relative to one another to facilitate removal.

After the wedge 180 has been removed from the end bell 80, the bearing sleeve 150 can be readily removed from the fixed bearing 112 held in place on the shaft 32. The bearing 112 can then be pulled off the shaft 32 using, for example, a specially designed device or removing member (not shown) configured to help overcome the strong frictional engagement between the inner ring 116 of the bearing 112 and the shaft 32.

The replacement bearing 112 is then attached to the shaft 32 and the bearing sleeve 150 and wedge 180 re-installed in the manner previously described. The shaft 32/end bell 80 immobilization is then removed, thereby allowing the rotary electric machine 20 to operate with the replacement bearing 112.

Referring back to FIG. 6, an optional cooling system 220 can be connected to the end bell 80 for helping to remove heat from the bearing assembly 110 during operation thereof. The cooling system 220 can include one or more pipes or tubes 230 that extend around the projection 83. As shown, a single tube 230 extends around the exterior of the projection 83 within a passage 236 formed in the end bell 80 and encircling the centerline 88. The passage 236 is positioned in close proximity to the exterior of the projection 83 to maximize heat transfer from the bearing 112 to the tube 230.

The tube 230 includes an inlet end 232 and an outlet end 234 that can be positioned adjacent to one another at a location spaced from the projection 83. In any case, the inlet end 232 and outlet end 234 are both fluidly connected to a reservoir 240 containing a cooling fluid, such as water, glycol or mixtures thereof. The cooling fluid enters the inlet end 232 of the tube 230 in the manner $F_1$, flows through the tube 230 circumferentially around the projection 83 (counterclockwise as shown), and exits the pipe through the outlet end 234 in the manner $F_2$.

During operation of the rotary electric machine 20, heat is generated by the rotating bearing 112. The heat, indicated by the arrows H in FIG. 6, flows radially outward from the bearing 112, through the bearing sleeve 150, through the electrically insulating material 174, through the wedge 180, through the projection 83, and through the tube 230 into the cooling liquid flowing therein. The electrically insulating material 174 is therefore positioned radially between the bearing 112 and the cooling tube 230. It is advantageous to provide an electrically insulating material 174 with a high thermal conductivity and position the tube 230 in close proximity with the projection 83 to maximize heat flow H out of the bearing 112, bearing sleeve 150, wedge 180, and projection 83 and into the cooling liquid.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A wedge for securing a bearing and a bearing sleeve to an end bell of a rotating electric machine, comprising:

an annular base extending about a centerline and including an inner surface defining an opening through the base for receiving the bearing and the bearing sleeve, the base including opposing first and second ends spaced circumferentially from one another by a gap for allowing relative movement therebetween during securing of the bearing and the bearing sleeve to the end bell.

2. The wedge recited in claim 1, wherein the gap allows for relative circumferential movement between the first and second ends of the base.

3. The wedge recited in claim 1 further comprising a flexible member connected to the first and second ends and extending through the gap.

4. The wedge recited in claim 3, wherein the flexible member comprises first and second legs extending circumferentially from the respective first and second ends and a portion extending radially for connecting the first and second legs.

5. The wedge recited in claim 4, wherein the connecting portion is round.

6. The wedge recited in claim 4, wherein the connecting portion extends towards the centerline.

7. The wedge recited in claim 1, wherein the base includes:
a tapered outer surface for engaging the end bell; and
a tapered inner surface for engaging the bearing sleeve.

8. The wedge recited in claim 7, wherein the base has a circumferential cross-section that is trapezoidal.

9. The wedge recited in claim 3, where the flexible member comprises a spring.

10. An assembly for a rotary electric machine having a bearing for receiving a portion of a rotor, comprising:
an end bell including an annular inner surface defining an opening for receiving the bearing;
a bearing sleeve including an annular base having an inner surface defining an opening for receiving the bearing and an outer surface; and
a wedge including an annular base with an inner surface defining an opening through the base for receiving the bearing such that the outer surface of the bearing sleeve engages the inner surface of the wedge, the base including opposing first and second ends spaced circumferentially from one another by a gap for allowing relative movement therebetween during securing of the bearing and the bearing sleeve to the end bell.

11. The assembly recited in claim 10 further comprising at least one pipe encircling the bearing sleeve and the wedge and receiving cooling fluid for removing heat from the bearing sleeve.

12. The assembly recited in claim 11, wherein at least a portion of the base of the bearing sleeve is form fit with an electrically insulating material positioned radially between the bearing and the at least one pipe.

13. The assembly recited in claim 10, wherein the inner surface of the wedge and the outer surface of the bearing sleeve are tapered.

14. The assembly recited in claim 10, wherein the inner surface of the end bell is tapered and engages a tapered outer surface of the base of the wedge.

15. The assembly recited in claim 10, wherein the gap allows for relative circumferential movement between the first and second ends of the base of the wedge.

* * * * *